United States Patent [19]
Kao

US005771237A

[11] Patent Number: 5,771,237
[45] Date of Patent: Jun. 23, 1998

[54] MULTIPLE RATE WAVESHAPING TECHNIQUE FOR FAST ETHERNET MEDIA DRIVER

[75] Inventor: Ron Kao, Saratoga, Calif.

[73] Assignee: Lite-On Communications Corp., Taipei, Taiwan

[21] Appl. No.: 590,428

[22] Filed: Jan. 23, 1996

[51] Int. Cl.$^6$ ...................................................... H04B 3/00
[52] U.S. Cl. .......................... 370/463; 370/538; 375/257; 327/106; 327/108
[58] Field of Search .................................. 370/463, 465, 370/469, 537, 538; 375/257, 258, 267, 377; 327/105, 106, 108, 361

[56] References Cited

U.S. PATENT DOCUMENTS

| | | |
|---|---|---|
| 5,048,055 | 9/1991 | Creigh et al. ............................. 375/229 |
| 5,309,036 | 5/1994 | Yang et al. ............................... 360/121 |
| 5,357,145 | 10/1994 | Segaram .................................. 327/361 |
| 5,485,488 | 1/1996 | Van Brunt et al. ...................... 375/257 |
| 5,541,957 | 7/1996 | Lau ......................................... 375/258 |

*Primary Examiner*—Hassan Kizou
*Attorney, Agent, or Firm*—Bacon & Thomas

[57] ABSTRACT

A multiple rate waveshaping method and apparatus for converting transmission data into communications code synthesized waveforms having different protocol frequencies in the physical layer of the fast Ethernet utilizes two state machines which convert the transmission data into appropriate waveforms using predetermined wave shaping signals, the outputs of the state machines being multiplexed and transmitted over the Ethernet media using a common set of differential current sourced drivers.

15 Claims, 10 Drawing Sheets

MULTIPLE RATE WAVESHAPING TECHNIQUE FOR FAST ETHERNET MEDIA DRIVER

FIELD OF THE INVENTION

The present invention relates to a waveshaping technique, and especially to a multiple rate waveshaping technique for a fast Ethernet media driver.

DESCRIPTION OF THE PRIOR ART

With the rapid development of the information industry, the information super highway is becoming the main communication avenue for the integration of all kinds of electronic information, such as the sharing of peripheral equipment, conveyance of E-mail and the sharing of databases.

When data is transmitted by computers or workstations on the information super highway, different communication protocols are used for different communication systems, such as the IEEE 802.3 and IEEE 802.5. These protocol frequencies are also constantly upgraded to accommodate the speedy growth of electronic technology; for example the general frequency of the ethernet of the IEEE 802.3 protocol for an ethernet is 10 BASE-T while its upgraded frequency is 100 BASE-T, etc.

Therefore the computer or workstation must convert the data into transmission codes according to the communication protocol frequency, and then couple the transmission codes into a transfer medium such as a twisted-pair, etc. Therefore in order to effectively and simply transfer and convert data of different protocols at the physical level of a network for matching different communication protocol frequencies such as 10 Mbps for 10 BASE-T or 125 Mbps for 100 BASE-T, a multiple rate-waveshaping technique for fast ethernet media drivers is needed.

PROBLEM SOLVED

The multiple rate waveshaping technique for fast ethernet media drivers of the present invention is used to solve this problem. The present invention can be used in application, such as transmission between both 10 BASE-T and 100 BASE-T Physical Interface at multiple data rates, 10 Mbps for 10 BASE-T and 125 Mbps for 100 BASE-T. The data speed is selectable and so is the waveshape and frequency spectrum content of the transmission waveshape. For the same media driver the selectable waveshape can be coupled to the transmission cable for different frequency spectrum requirements of 10 BASE-T and 100 BASE-T Physical Interfaces.

THE DEVICE OF THE PRESENT INVENTION

The multiple rate waveshaping technique for fast ethernet media driver of the present invention is made up of state machines of different frequency, select multiplexers and a set of differential current source drivers. The waveshaping technique of the present invention selects a state machine according to the communication protocol frequency. This state machine generates a series of waveshape signals from transmission data and feeds the signals into a current source driver, and then the waveshape signals are coupled with transmission media by the power driver. Therefore the wavefrom generator of the present invention generates multiple rates in a network interface card.

Moreover, the state machine is designed to include some pre-stored waveshapes. The pre-stored waveshapes is utilized for reducing the EMI (Electronic magnetic interference) by shifting the frequency power spectrum to low frequency without an external Low Pass Filter. The waveshapes are determined for any data sequence and variable data rate, and stored in the state machine. By pre-stored the group of current drivers, any waveshapes can be synthesized for different applications.

EMBODIMENTS OF THE PRESENT INVENTION

The multiple rate waveshaping technique for fast ethernet media drivers of the preferred embodiment of the present invention is described hereinafter, with reference to the figures.

Figure 1:
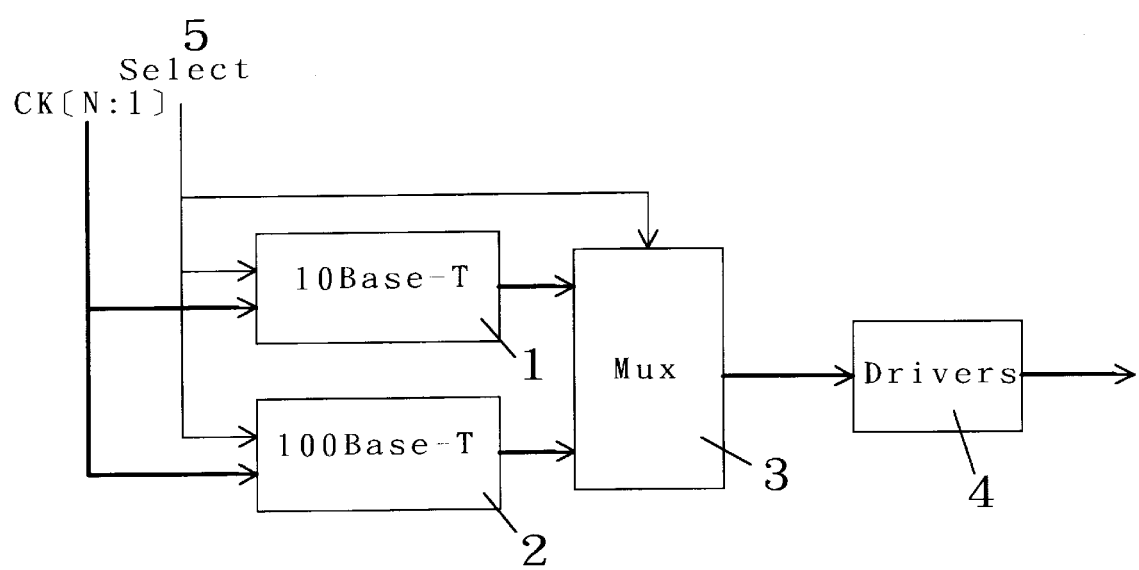
FIG. 1 is a functional block diagram of the multiple rate waveshaping technique for fast ethernet media drivers of the preferred embodiment of the present invention.

FIG. 1 is a block diagram of the multiple rate waveshaping technique for fast ethernet media drivers of the preferred embodiment of the present invention. The block diagram show of two sets of state machine 1 (10 BASE-T) and 2 (100 BASE-T), a set of select multiplexers 3 (Mux), and a set of differential current source drivers 4 (Drivers). The block diagram further show a select signal line 5 (Select) and a sampling pulse CK[N:1]. The select signal line 5 is used to select the different state machines 1 or 2 of different protocol frequency and provides the select signal to the select multiplex 3; while the sampling pulse provides a reference pulse CK[N:1] to the state machine 1 and state machine 2. N is selected as 7 in this example.

Figure 2:
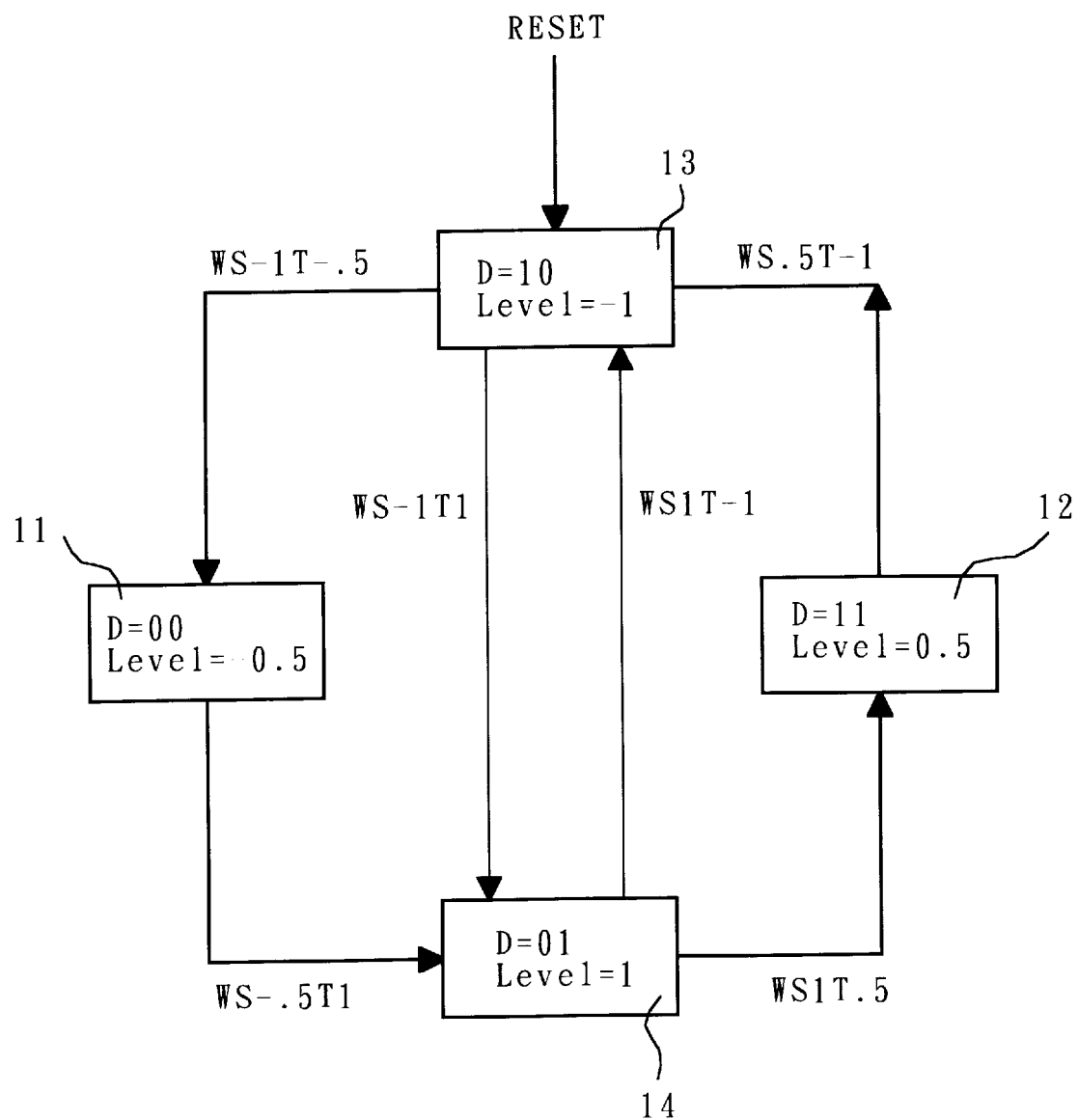
FIG. 2 shows the state diagram of a state machine which can generate 10 BASE-T Manchester Code.
Figure 3:
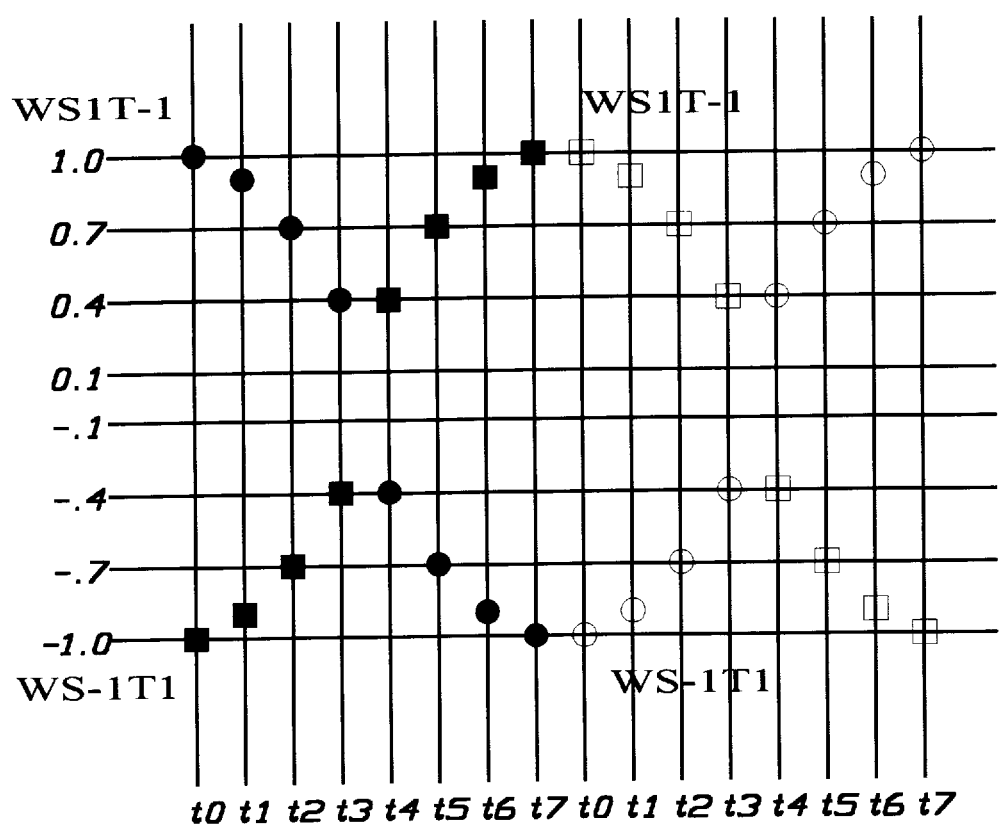
FIG. 3 shows a predetermined short waveshape used in the state diagram of FIG. 2.
Figure 4:
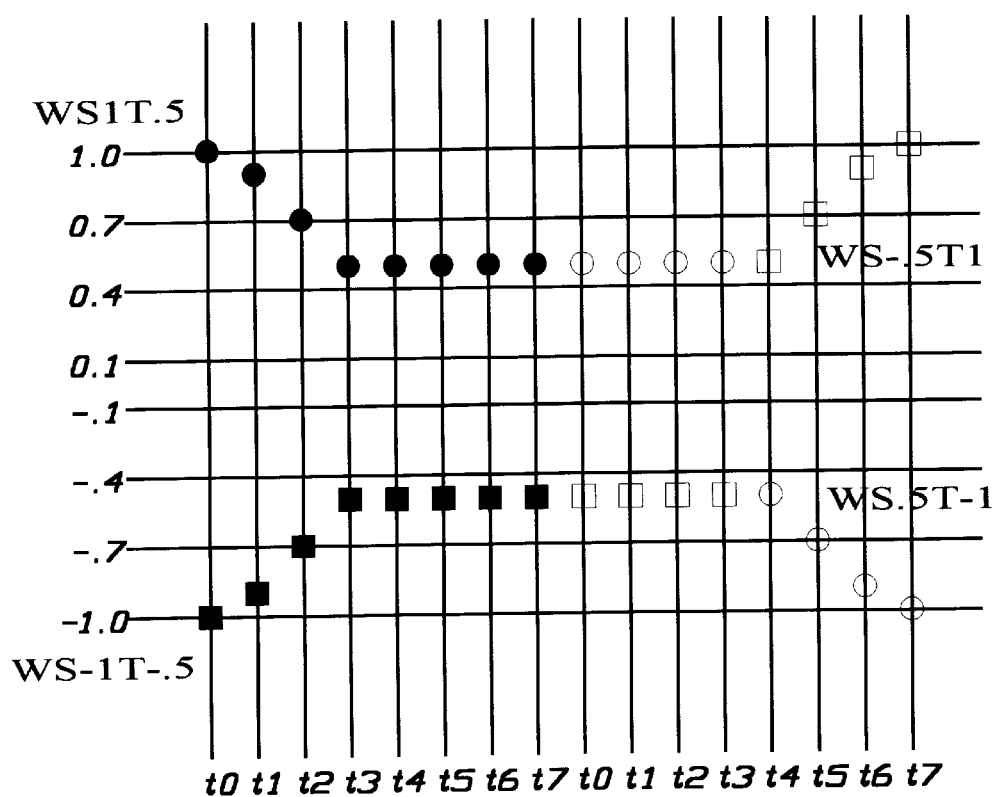
FIG. 4 shows a predetermined long waveshape used in the state diagram of FIG. 2.
Figure 5:
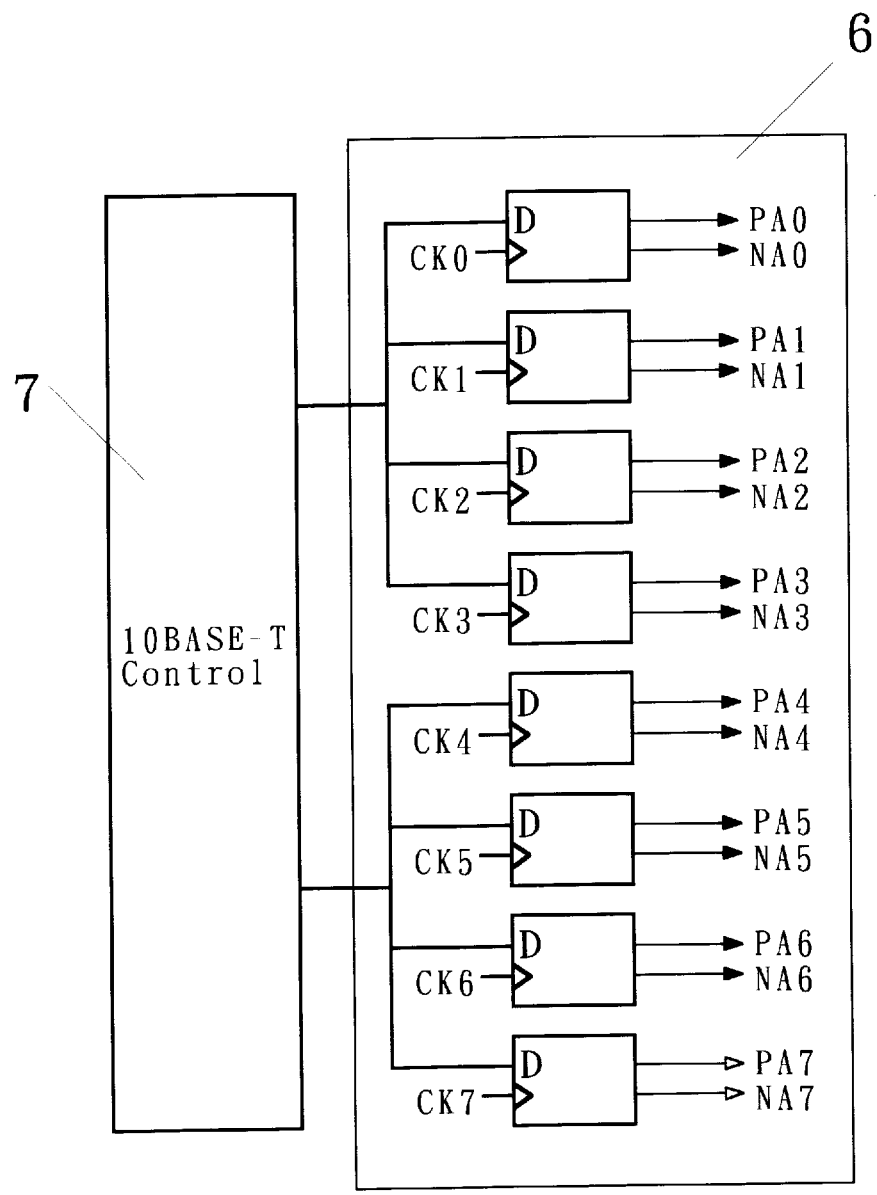
FIG. 5 shows a waveshape download machine used the 10 BASE-T state machine of FIG. 2.

FIG. 2 is the diagram of state machine 1 for generating a 10 BASE-T Manchester Code. FIG. 3 shows a pre-stored short waveshape used by the state machine of FIG. 2. FIG. 4 shows a pre-stored long waveshape used by the state machine of FIG. 2. FIG. 5 shows a waveshape download machine used by the state machine.

As shown in the FIG. 2, the state diagram for the Manchester Code of the present invention comprises 4 states 11, 12, 13, and 14, and 6 pre-stored waveshapes WS-1T1, WS1T-1,WS-1T-.5,WS-.5T1,WS1T.5,WS.5T-1, wherein the 4 states are:

State 11, in which D=00, the datum is retained as a "0", and the waveshape signal comprises two pre-stored short waveshapes WS-1T1, WS1T-1 (referring to FIG. 3).

State 12, in which D=11, the datum is retained as a "1", and the waveshape signal comprises two pre-stored short waveshapes WS1T-1, WS-1T1 (referring to FIG. 3).

State 13, in which D=10, the datum is changed from "1" to "0", and the waveshape signal comprises a long wave containing two pre-stored short waveshapes WS1T.5, WS.5T-1 (referring to FIG. 4).

State 14, in which D=01, the datum is changed from "0" to "1", and the waveshape signal comprises a long wave containing two pre-stored short waveshapes WS-1T-.5, WS.5T1 (referring to FIG. 4).

Referring now to FIGS. 3 and 4 (the abscissa shows the time and the ordinate shows the level), the level of the pre-stored 6 waveshapes is as follows.

WS-1T1: the transmission level is changed from −1 to 1, as shown in the black block section curve of the FIG. 3. In the curve, the transmission level is changed from −1 at time t0 to 1 of time t7 through −0.7, −0.4, 0.4, 0.7, and 0.9 at t2, t3, t4, t5, and t6, respectively.

WS1T-1: the transmission level is changed from 1 to −1, as shown in the black round point curve of the FIG. 3. In the curve, the transmission level is changed from 1 at time t0 to −1 of time t7 through 0.7, 0.4, −0.4, −0.7, and −0.9 at t2, t3, t4, t5, and t6, respectively.

WS-1T-.5: the transmission level is changed from −1 to −0.5, as shown in the black block section curve of the FIG. 4. In the curve, the transmission level is changed from −1 at time t0 through −0.7, and −0.5 at t2 and t3, respectively, and then is retained at 0.5 from t4 to t7.

WS-.5T1: the transmission level is changed from −0.5 to −1, as shown in the white block section curve of the FIG. 4. In the curve, the transmission level is retained at −0.5 through t0 to t3, then it is changed from 0.5 of t4 to 1 at t7 through 0.7 and 0.9 at t5 and t6, respectively.

WS1T.5: the transmission level which is the front part of a long wave is changed from 1 to 0.5, as shown in the black block section curve of the FIG. 4. In the curve, the transmission level is changed from 1 at time t0 through 0.9, 0.7 and 0.5 at t1, t2 and t3, respectively, and then is retained at 0.5 from t4 to t7.

WS.5T-1: the transmission level which is the later part of a long wave is changed from 0.5 to −1, as shown in the white block section curve of the FIG. 4. In the curve, the transmission level is retained at 0.5 through t0 to t3, then it is changed from −0.5 of t4 to −1.0 at t7 through −0.7 and −0.9 at t5 and t6, respectively.

The change for each information in the state diagram of FIG. 2 includes two short waves or half waves. Each of those waves contains the time period from t0 to t7. Because the state machine needs to generate a waveshape of 10 Mbps, the period of each half wave is 50 ns. Therefore, the total time of two half waves is 100 ns so the frequency is exactly equal to 10 Mbps.

The state machine shown in FIG. 5 comprises a state control section 7 and a waveshape download machine 6, wherein the waveshape download machine downloads the predetermined waveshape into the current source driver 4 by using a D type flip-flop. The timing of the download machine 6 is controlled by a sampling pulse CK[7:0]. Each one of the set of sampling pulses CK[7:0] is delayed for 50 ns so that it generated a synthesized waveshape with an equal period of 50 ns, while the adjacent pulses, such as CK1, CK2, etc., are separated by 6.25 ns. The pulse may be generated by a general circular oscillator of an analog phase-locked loop.

Figure 6:
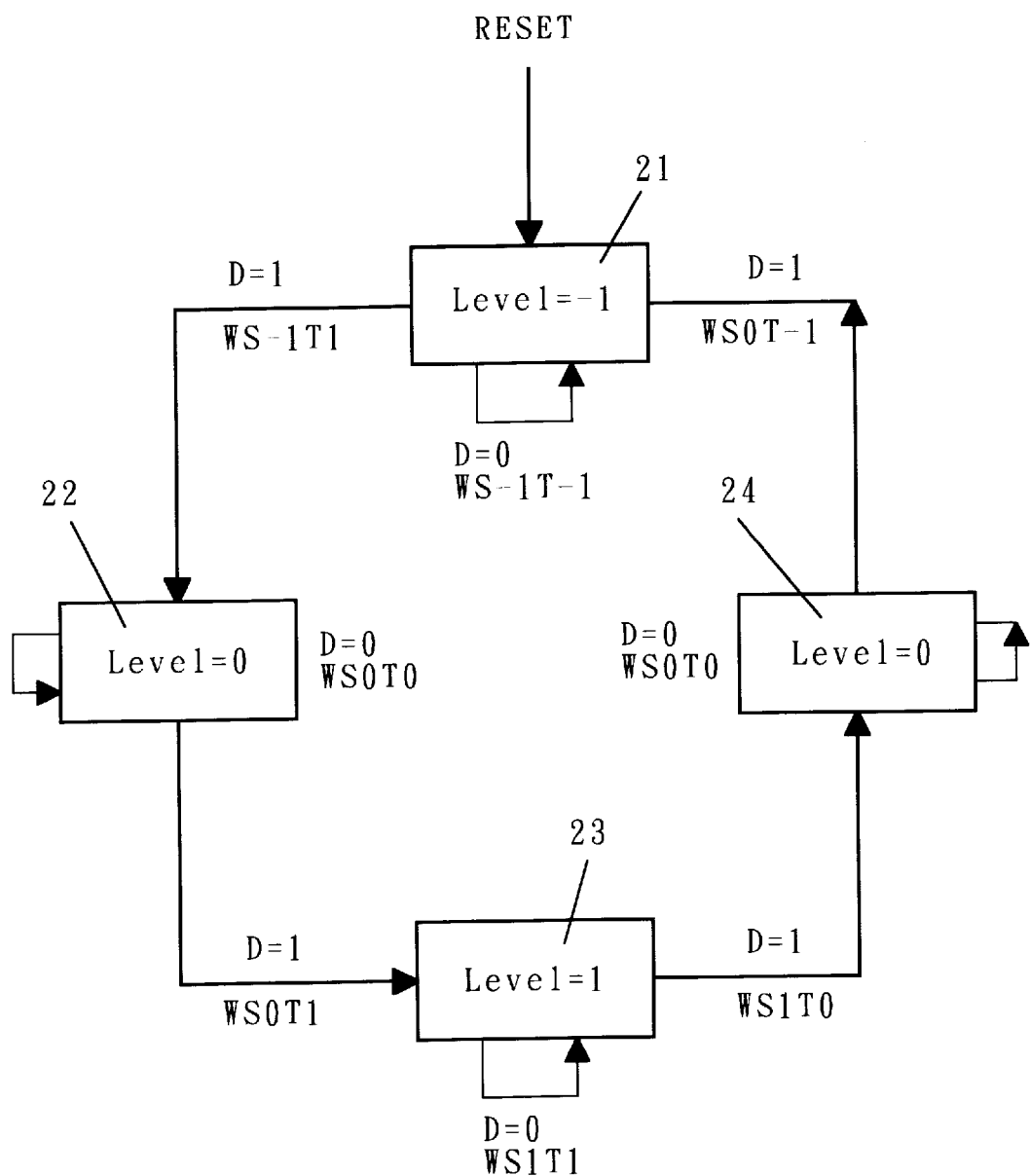
FIG. 6 is the state diagram of a state machine which can generate 100 BASE-T MLT-3 Code.
Figure 7:
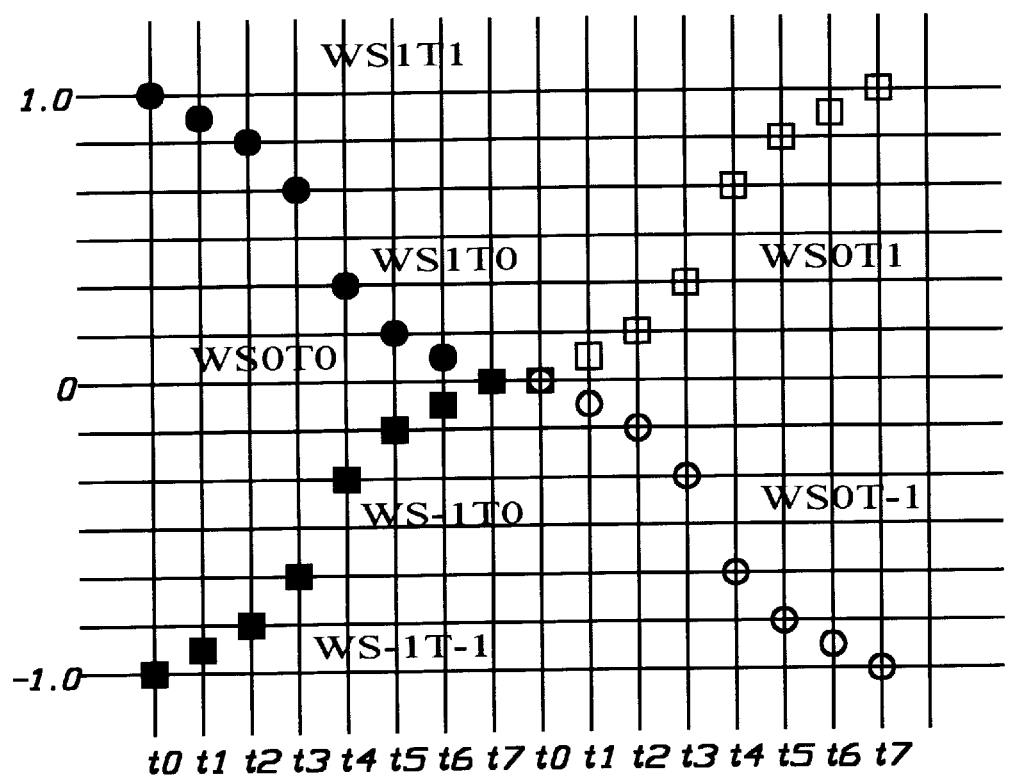
FIG. 7 shows a predetermined waveshape used in the state diagram of FIG. 6.
Figure 8:
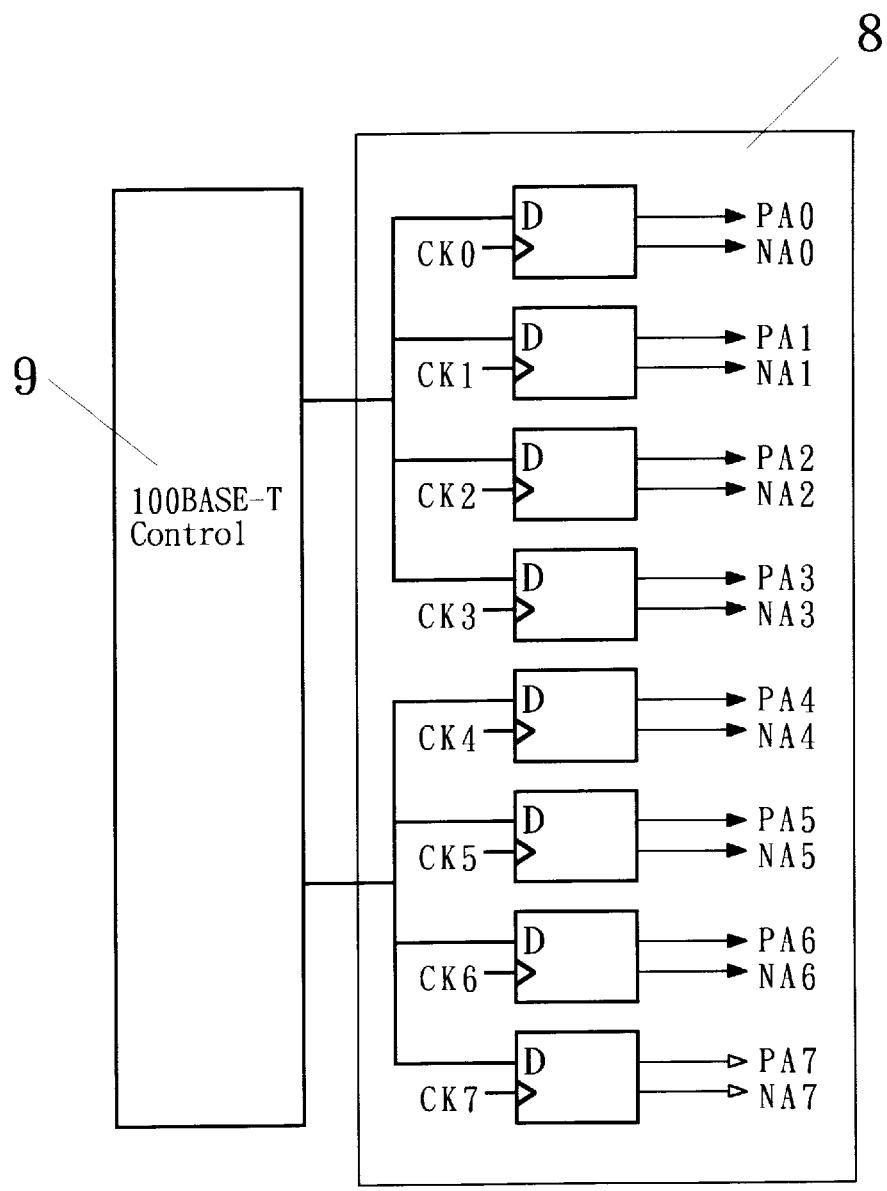
FIG. 8 shows a waveshape download machine using the 100 BASE-T state machine of FIG. 6.

FIG. 6 shows the state diagram of the state machine 2 which can generate 100 BASE-T MLT-3 Code. FIG. 7 shows a pre-stored waveshape used in FIG. 6. FIG. 8 shows a waveshape download machine 7 used in the 100 BASE-T state machine 2.

As shown in the state diagram of FIG. 6, there are four kinds of MLT-3 Code in the present embodiment which form states 21, 22, 23 and 24. Referring now to FIG. 7, there are three types of the pre-stored waveshapes of the state machine 7, including elevating waveshapes, descending waveshapes, and horizontal waveshape. The seven pre-stored waveshapes are: WS0T0, WS1T1, WS-1T-1, WS1T0, WS0T1, WS-1T0 and WS0T-1. If the transmission data is 1, MLT-3 Code performs the elevating or descending transformation of 0 to 1, 1 to 0, 0 to −1 or −1 to 0 according the prior condition of the transmission code level (i.e., 0, 1, −1). If the transmission data is 0, the transmission code level state is retained in the original state. The level transformation of the seven pre-stored waveshapes is as follows:

WS0T0 is a waveshape for which the transmission level is retained at 0, for example, the black horizontal line in the upper part of FIG. 7.

WS1T1 is a waveshape for which the transmission level is retained at 1, for example, the black horizontal line in the middle part of FIG. 7.

WS-1T-1 is a waveshape for which the transmission level is retained at −1, for example, the black horizontal line in the lower part of FIG. 7.

WS0T1 is an elevating waveshape for which the transmission level is transmitted from 0 to 1, for example, the white block elevating curve in FIG. 7.

WS0T-1 is a descending waveshape for which the transmission level is transmitted from 0 to −1, for example, the white block descending curve in FIG. 7.

WS1T0 is a descending waveshape for which the transmission level is transmitted from 1 to 0, for example, the black circular point descending curve in FIG. 7.

WS-1T0 is a elevating waveshape for which the transmission level is transmitted from −1 to 0, for example, the black circular point elevating curve in FIG. 7.

The state change thereof is as follows:

State 21: the transmission level is equal to 1. If the transmission datum is 0, the transmission datum is retained as the original form, i.e., the waveshape of WS-1T-1. If the transmission datum is 1, the transmission level is elevated to 0 according to the elevated waveshape WS-1T0 and is changed to the state 22.

State 22: the transmission level is equal to 0. If the transmission datum is 0, the transmission datum is retained as the original form, i.e., the waveshape of WS0T0. If the transmission datum is 1, the transmission level is elevated to 1 according to the elevated waveshape WS0T1 and is changed to the state 23.

State 23: the transmission level is equal to 1. If the transmission datum is 0, the transmission datum is retained as the original form, i.e., the waveshape of WS1T1. If the transmission datum is 1, the transmission level is descended to 0 according to the descended waveshape WS1T0 and is change to the state 24.

State 24: the transmission level is equal to 0. If the transmission datum is 0, the transmission datum is retained as the original form, i.e., the waveshape of WS0T0. If the transmission datum is 1, the transmission level is descended to −1 according to the descended waveshape WS0T-1 and is changed to the state 21.

In FIG. 6, each change of the data is generated from one of the predetermined waveshapes. Since the state machine 2 must generate a waveshape of 125 Mbps, the period of each waveshape is equal to 8 ns, which means that the time between t0 and t7 is 8 ns.

The state machine 2 shown in FIG. 8 includes a state control section 9 and a waveshape download machine 8, in which the waveshape download machine 9 downloads the predetermined waveshape of the state machine 2 into the current source driver 4 by using D type flip-flop. The timing of the download machine 8 is controlled by a sampling pulse CK[7:0]. Each one of the set of sampling pulses CK[7:0] is delayed for 8 ns so that it generates a synthesized waveshape with equal periods of 8 ns. While the adjacent pulses, such as CK1, CK2, etc., are separated by 1 ns. The pulses may be generated by a general circular oscillator of an analog phase-locked loop.

Figure 9:
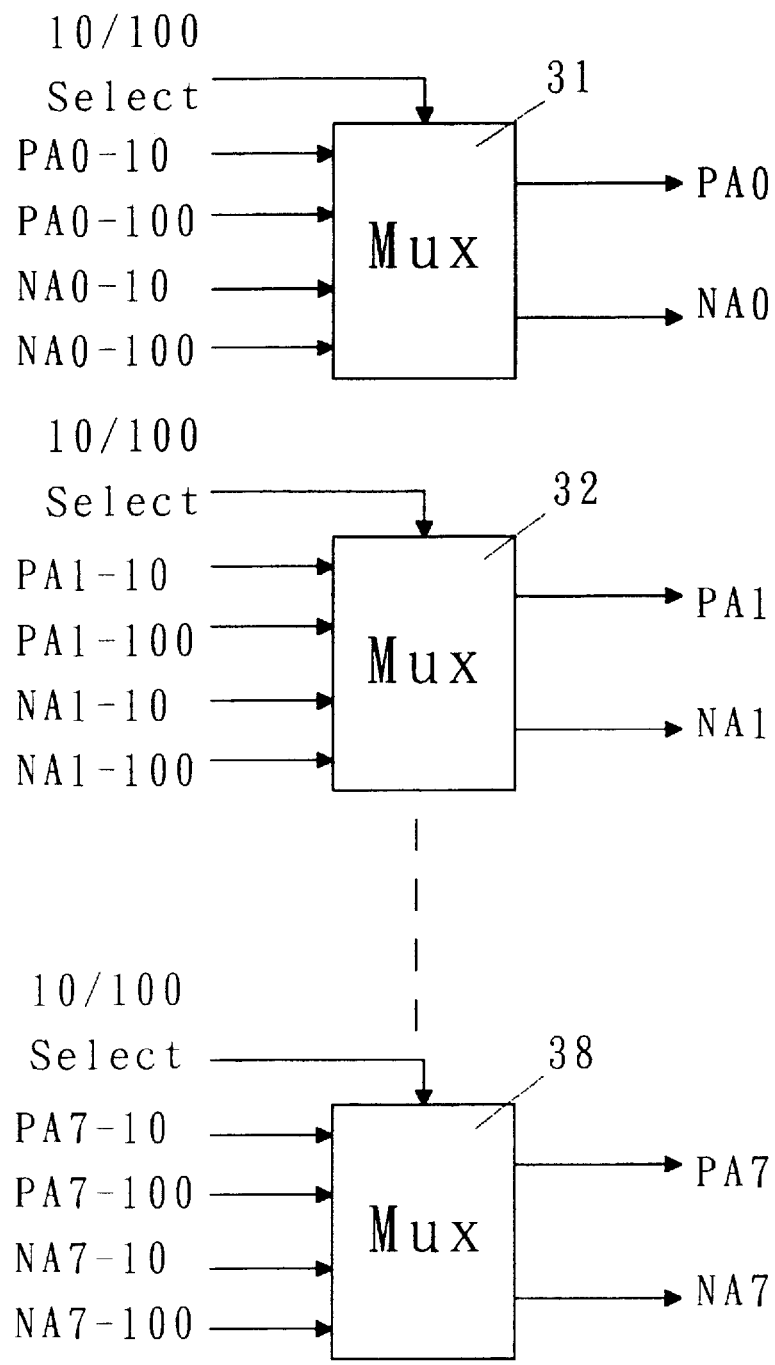
FIG. 9 shows a select multiplexer.

The select multiplexer 3 in FIG. 9 selects the waveshape signal generated by state machine 1 or state machine 2 according to the select signal line 5 and transfers the signals to the current source driver 4. The driver 4 includes eight multiplexers 31 to 38 having two sets of select functions of two to 1.

Figure 10:
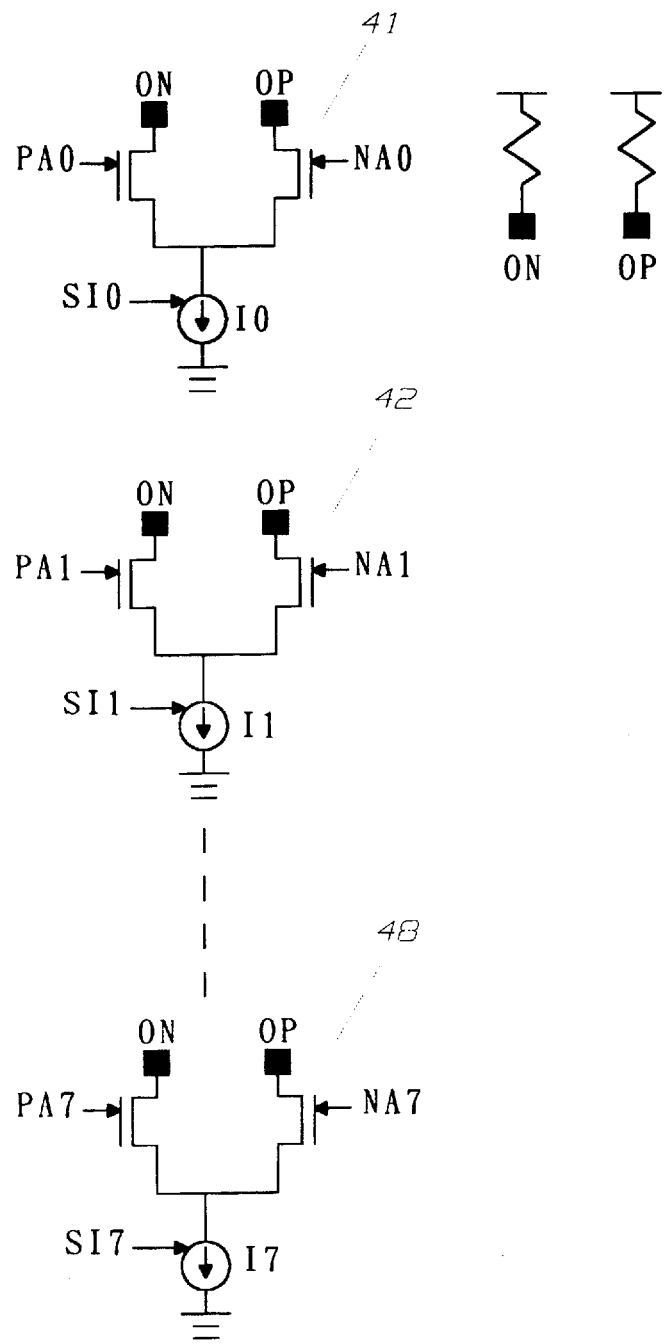
FIG. 10 shows a set of differential current source drivers.

The current source driver 4 of FIG. 10 couples the output waveshape signal of the select multiplexers 3 into the transmission media. The current source driver 4 contains eight independent current source drivers 41 to 48. Various waveshapes are synthesized from the predetermined waveshape signals of state machine 1, 2 as well as current source drivers with different current values. Each of the current source drivers 41 to 48 may have different current valves.

While the invention has been described in connection with what is presently considered to be the most practical and preferred embodiment, it is to be understood that those skilled in the art can make various modifications and variations of the illustrated preferred embodiment. For example, the current source drivers in the embodiment may be changed from eight to ten so to increase the quality of the waveshape, but the number of the current source drivers must match the number of state machines. Also, the predetermined waveshapes can be changed to match the communication transmission codes of different communication protocols. Therefore, the invention is not to be limited to the disclosed embodiment, but on the contrary, is intended to cover any modifications and equivalent arrangements included within the spirit and scope of the appended claims.

I claim:

1. A method of multiple rate waveshaping for fast Ethernet media drivers, comprising the steps of:

converting first transmission data into signals having waveforms suitable for transmission at a first frequency over an Ethernet twisted pair cable by selecting from among a plurality of predetermined waveshape signals corresponding to the transmission data having the first frequency;

converting second transmission data signals having waveforms suitable for transmission at a second frequency over said Ethernet twisted pair cable by selecting from among a second plurality of predetermined waveshape signals corresponding to the transmission data having the second frequency;

multiplexing waveforms resulting from said selection and supplying the multiplexed signals to a set of differential current source drivers, said differential current source drivers thereby commonly supplying signals corresponding to said first and second transmission data to said Ethernet twisted pair cable.

2. A method as claimed in claim 1, wherein the steps of converting said first and second transmission data comprises the steps of downloading said waveforms during a predetermined period adapted to a frequency of the communications protocol of the transmission data.

3. A method as claimed in claim 2, wherein the step of downloading said waveshape signals during a predetermined period comprises the step of generating a group of reference pulses adapted to the frequency of the communications protocol by means of a multiple phase pulse controller.

4. A method as claimed in claim 1, wherein the steps of converting said first and second transmission data comprises the steps of converting the transmission data based on pre-stored state variations.

5. A method as claimed in claim 1, wherein said first frequency is 10 Mbps.

6. A method as claimed in claim 1, wherein said second frequency is 125 Mbps.

7. A method as claimed in claim 6, wherein said first frequency is 10 Mbps.

8. Apparatus providing multiple rate waveshaping for fast Ethernet media drivers, comprising:

means including a first state machine for converting first transmission data into signals having waveforms suitable for transmission at a first frequency over an Ethernet twisted pair cable by selecting from among a plurality of predetermined waveshape signals corresponding to the transmission data having the first frequency;

means including a second state machine for converting second transmission data signals having waveforms suitable for transmission at a second frequency over said Ethernet twisted pair cable by selecting from among a second plurality of predetermined waveshape signals corresponding to the transmission data having the second frequency;

means for multiplexing waveforms resulting from said selection and supplying the multiplexed signals to a set of differential current source drivers, said differential current source drivers thereby commonly supplying signals corresponding to said first and second transmission data to said Ethernet twisted pair cable.

9. Apparatus as claimed in claim 8, wherein the first and second state machines comprises means for downloading said wave shape signals during a predetermined period adapted to a frequency of the communications protocol of the transmission data.

10. Apparatus as claimed in claim 9, wherein the means for downloading said waveshape signals during a predetermined period comprise means for generating a group of reference pulses adapted to the frequency of the communications protocol by means of a multiple phase pulse controller.

11. Apparatus as claimed in claim 8, wherein the first and second state machines comprise means for converting the transmission data based on pre-stored state variations.

12. Apparatus as claimed in claim 8, wherein said first frequency is 10 Mbps.

13. Apparatus as claimed in claim 8, wherein said second frequency is 125 Mbps.

14. Apparatus as claimed in claim 13, wherein said first frequency is 10 Mbps.

15. Apparatus as claimed in claim 8, wherein said first and second state machines are respectively, a 10 BASE-T state machine and a 100 BASE-T state machine.

* * * * *